United States Patent
Mine (10) Patent No.: US 10,725,536 B2
(45) Date of Patent: Jul. 28, 2020

(54) VIRTUAL INDICIUM DISPLAY SYSTEM FOR GAZE DIRECTION IN AN IMAGE CAPTURE ENVIRONMENT

(71) Applicant: Disney Enterprises, Inc., Burbank, CA (US)

(72) Inventor: Mark Mine, Santa Clarita, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/107,615

(22) Filed: Aug. 21, 2018

(65) Prior Publication Data

US 2020/0064911 A1 Feb. 27, 2020

(51) Int. Cl.
*G06F 3/01* (2006.01)
*G06F 3/0481* (2013.01)
*G06T 19/00* (2011.01)

(52) U.S. Cl.
CPC .............. *G06F 3/012* (2013.01); *G06F 3/013* (2013.01); *G06F 3/04815* (2013.01); *G06T 19/006* (2013.01)

(58) Field of Classification Search
None
See application file for complete search history.

(56) References Cited

U.S. PATENT DOCUMENTS

| 2008/0065468 A1* | 3/2008 | Berg | G06Q 30/02 |
| | | | 705/7.32 |
| 2017/0208292 A1* | 7/2017 | Smits | H04N 13/243 |
| | | | 13/243 |
| 2018/0144520 A1* | 5/2018 | Forutanpour | G06T 3/0018 |
| 2019/0114835 A1* | 4/2019 | Costa | G06F 3/011 |
| 2019/0172261 A1* | 6/2019 | Alt | G06F 3/017 |

\* cited by examiner

*Primary Examiner* — Hilina K Demeter
(74) *Attorney, Agent, or Firm* — Patterson + Sheridan, LLP (57) ABSTRACT

A process determines, with a processor, a virtual indicium position in a physical environment at which a virtual indicium is to be projected. The processor determines the virtual indicium position based on a point of intersection of a vector and an object within the physical environment. The vector originates at a head position of a user and is directed through a point of intended gaze on a virtual object toward the virtual indicium. Further, the processor sends, with the processor to an actuator, an instruction to adjust a position of a projector in operable communication with the actuator so that the projector projects the virtual indicium toward the virtual indicium position.

20 Claims, 12 Drawing Sheets

VIRTUAL INDICIUM DISPLAY SYSTEM FOR GAZE DIRECTION IN AN IMAGE CAPTURE ENVIRONMENT

BACKGROUND

1. Field

This disclosure generally relates to the field of augmented reality ("AR") systems.

2. General Background

Conventional AR systems and/or green screen configurations typically allow users to interact with virtual objects via a virtual environment that is registered (i.e., overlaid at corresponding positions) with a physical environment. In a cinematographic context (e.g., movie, television show, etc.), actors typically cannot see the virtual objects with which they are interacting in relation to an AR system camera or a green screen. To help direct the gaze of the actors in the direction of the virtual object, humans may carry one or more sticks with balls adhered to the ends to indicate the location at which the actors should be looking. Yet, the gaze of an actor often has to be in the direction of an object within the field of view of a camera, resulting in the stick with the ball appearing in the video/image capture. As an alternative, a display device (e.g., a television, computer monitor, etc.) may be positioned in front of the actor, but out of the field of view of the camera, to display a view from the perspective of the camera of where the virtual object is supposed to be positioned. Yet, this configuration necessitates the actor translating the coordinate system of the camera to his or her own coordinate system, which often results in the actor hunting for the correct gaze (i.e., searching back and forth between looking at the display device and gazing at the intended position). Accordingly, conventional AR systems and/or green screen configurations do not direct the gaze of an actor in a cinematographic context to provide an adequate sense of realism.

SUMMARY

In one aspect, a computer program product comprises a non-transitory computer readable storage device having a computer readable program stored thereon. The computer readable program when executed on a computer causes the computer to determine, with a processor, a virtual indicium position in a physical environment at which a virtual indicium is to be projected. The processor determines the virtual indicium position based on a point of intersection of a vector and an object within the physical environment. The vector originates at a head position of a user and is directed through a point of intended gaze on a virtual object toward the virtual indicium. Further, the computer is caused to send, with the processor to an actuator, an instruction to adjust a position of a projector in operable communication with the actuator so that the projector projects the virtual indicium toward the virtual indicium position.

In another aspect, the computer readable program when executed on a computer causes the computer to determine, with a processor, a virtual indicium position in a physical environment at which a virtual indicium is to be projected. The processor determines the virtual indicium position based on a point of intersection of a vector and an object within the physical environment. The vector originates at a head position of a user and is directed through a point of intended gaze on a virtual object toward the virtual indicium. Further, the computer is caused to display, at the display device, the virtual indicium at the virtual indicium position in the physical environment.

In yet another aspect, an apparatus has a processor that performs the functionality of the aforementioned computer readable programs. In yet another aspect, a process performs such functionality.

BRIEF DESCRIPTION OF THE DRAWINGS

The above-mentioned features of the present disclosure will become more apparent with reference to the following description taken in conjunction with the accompanying drawings, wherein like reference numerals denote like elements and in which.

DETAILED DESCRIPTION

A system is provided to display a virtual indicium (e.g., visual marker, imagery, text, etc.) in a physical environment to direct the gaze of a user (e.g., actor) toward a virtual object that is not visible in the physical environment. The gaze of the user may be captured by an AR image capture device, or by a non-AR image capture device in front of a green screen, in a physical environment (e.g., movie set, capture stage, television set, etc.). The gaze may be composited into the view of the AR image capture device, or green-screened into the feed of the non-AR image capture device. Even though the user is unable to see the virtual object, the user is able to see the virtual indicium and adjust his or her gaze to provide a realistic impression that the user is viewing the virtual object. Alternatively, the virtual indicium may be used to adjust motions of limbs/digits of the user. The system may track the head position of the user (e.g., via facial recognition) without any specialized head apparatus (e.g., AR glasses), which may interfere with video/image capture of the user. Further, in contrast with previous configurations, the system allows for the virtual indicium to be displayed out of the field of view of a video/image capture device while the virtual object is within the field of view of the video/image capture device. In addition, the virtual indicium may be displayed according to three-dimensional coordinates to allow for more accurate gazes and/or gestures than previous configurations that were typically limited to two-dimensional cues (e.g., a two-dimensional television displaying a virtual object from the perspective of a camera). Further, the virtual indicium may be projected in a color that is visible to the actor, but is not captured by a camera. Accordingly, the virtual indicium is computed and displayed such that it is corrected when viewed from the perspective of the actor. In contrast, previous configurations encompassed the actor having to view the output of the filming camera and adjust his or her gaze by adjusting his or her head position until the gaze appeared correct from the filming camera's perspective.

Figure 1:
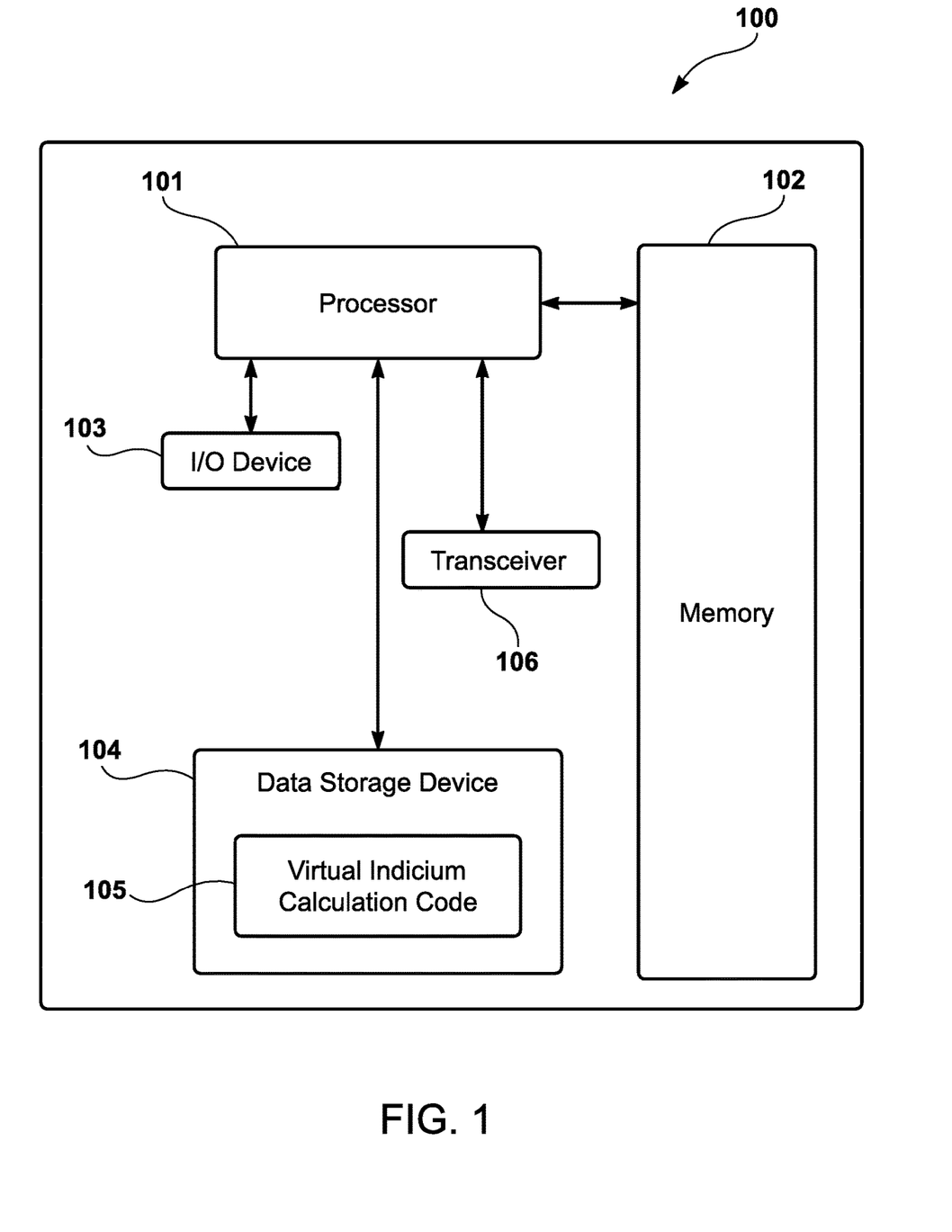
FIG. 1 illustrates a block diagram of the internal components of an AR system that is used to calculate a virtual indicium that may be projected or displayed to direct the gaze of a user.

FIG. 1 illustrates a block diagram of the internal components of an AR system 100 that is used to calculate a virtual indicium that may be projected or displayed to direct the gaze of a user to obtain more realistic impressions of the user during filming. Although the AR system 100 is described herein in the context of AR configurations, the AR system 100 may also be used in green screen configurations, broadcasting configurations, gaming configurations, etc.

The AR system 100 has a processor 101, a memory 102, an input/output ("I/O") device 103 (e.g., microphone, keyboard, mouse, pointer, camera, display device, etc.), a data storage device 104, and a transceiver 106.

Further, the data storage device 104 stores thereon virtual indicium calculation code 105. The processor 101 executes the virtual indicium calculation code 105 to compute a position in a physical environment at which the virtual indicium should be displayed to direct the gaze of the user. In particular, the processor 101 calculates the virtual indicium by determining a point of intersection of a vector and an object within the physical environment. The vector originates at a tracked head position of the user and is directed through a point of intended gaze on a virtual object toward the virtual indicium. As a result, the virtual indicium may be positioned outside of the field of view of a video/image capture device that captures the gaze of the user toward a virtual object (invisible within the physical environment) within the field of view of the user.

Figure 2:
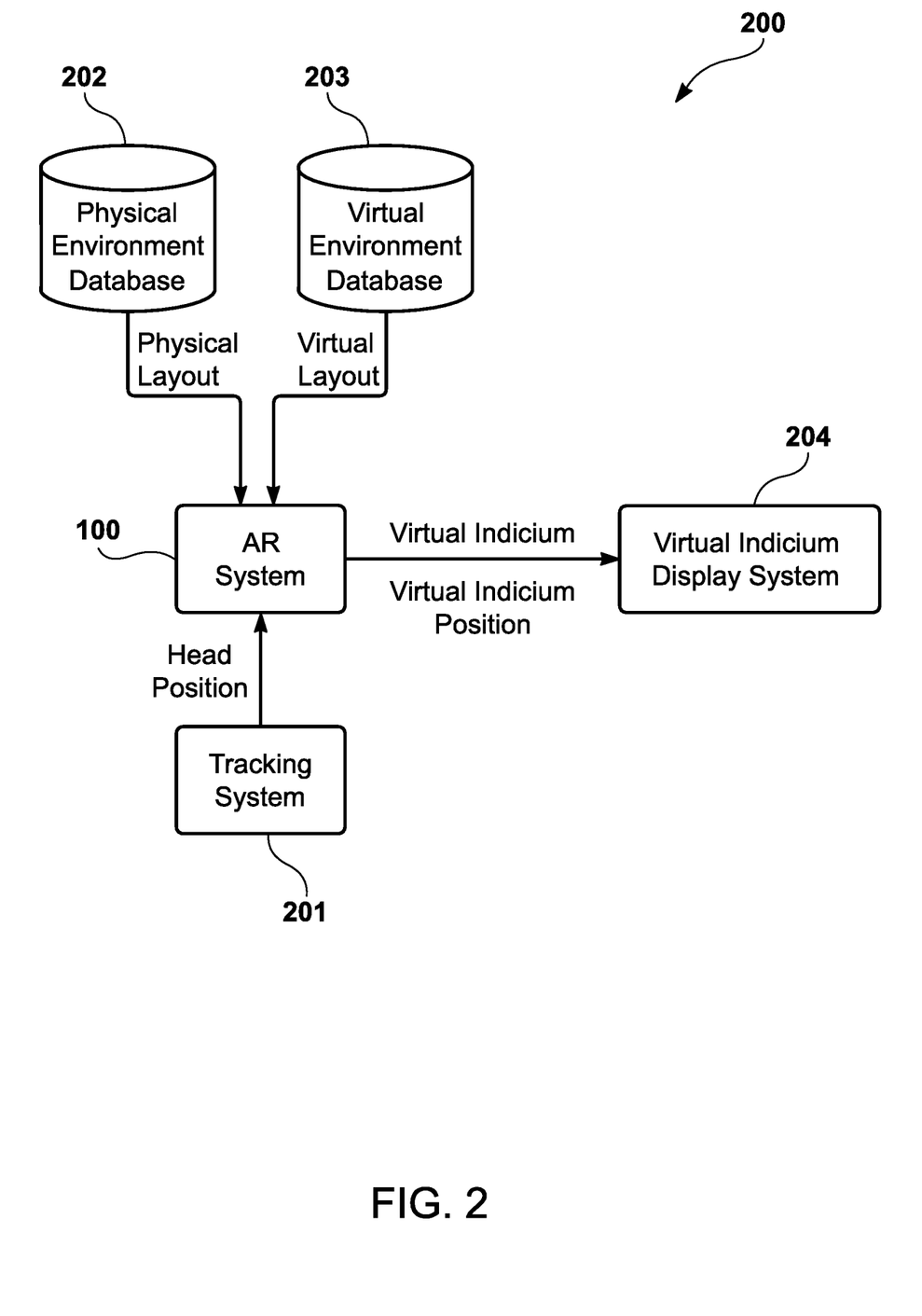
FIG. 2 illustrates a gaze adjustment system that uses the AR system 1 illustrated in FIG. 1 to adjust the gaze of the user toward a virtual object.

FIG. 2 illustrates a gaze adjustment system 200 that uses the AR system 100 illustrated in FIG. 1 to adjust the gaze of the user toward a virtual object. A tracking system 201 (e.g., one or more cameras, magnetic sensors, tracking device hidden in an actor's hair, or other tracking device that is not apparent to the user) may be used to track the head position of the user (e.g., actor). For example, the tracking system 201 may use facial recognition code to track the location of the user. The AR system 100 may receive the user tracking data (e.g., via transceiver 106 illustrated in FIG. 1) from the tracking system 201. Alternatively, the tracking system 201 is integrated within the AR system 100.

Further, the AR system 100 may receive physical layout data (e.g., room dimensions) from a physical environment database 202. Alternatively, the AR system 100 may calculate the physical layout data (e.g., by scanning a physical environment with a mobile device having one or more AR libraries). In addition, the AR system 100 may receive virtual layout data from a virtual environment database 203 (e.g., via transceiver 106 illustrated in FIG. 1). For example, the virtual layout data may provide a virtual layout that is to be overlaid over the physical environment. As yet another alternative, the physical environment database 202 and the virtual environment database 203 may be integrated into a single database.

The AR system 100 may then register the virtual layout data with the physical layout data. As a result, the AR system 100 is able to determine the intended position of the virtual object in the virtual overlay with respect to the particular objects (e.g., walls, floors, ceilings, projection screens, etc.) positioned within the physical environment. The AR system 100 is then able to calculate, via the processor 101 (FIG. 1), a vector originating at the head position of the user, as tracked by the tracking system 201, directed through the registered position of a point of interest (e.g., corner, center, etc.) on the virtual object. Since the AR system 100 is also aware of the surrounding objects (e.g., walls, floors, ceilings, furniture, etc.) in the physical environment, the AR system 100 may calculate a point of intersection between the vector and a surrounding object; that point of intersection is the position of the virtual indicium.

Further, the AR system 100 may send the virtual indicium position, and possibly the virtual indicium if necessary, to a virtual indicium display system 204 for display of the virtual indicium at the virtual indicium position. The virtual indicium may be a marker such as a colored dot that alerts the user to gaze in a particular direction. Alternatively, the virtual indicium may include various imagery (e.g., smiley face) or text that provides an instruction (e.g., "smile") to evoke not only a gaze, but also a particular emotional reaction from the user during the gaze. As yet another alternative, the virtual indicium may provide feedback to the user as to whether or not the user has to provide further adjustments (e.g., larger or smaller dot to move farther away or closer). The virtual indicium display system 104 may or may not have stored thereon the virtual indicium prior to a determination by the AR system 100 of the virtual indicium position. As yet another alternative, the virtual object may be rendered and projected onto the physical environment so that the virtual object appears correct from the perspective of the user.

Figure 3A:
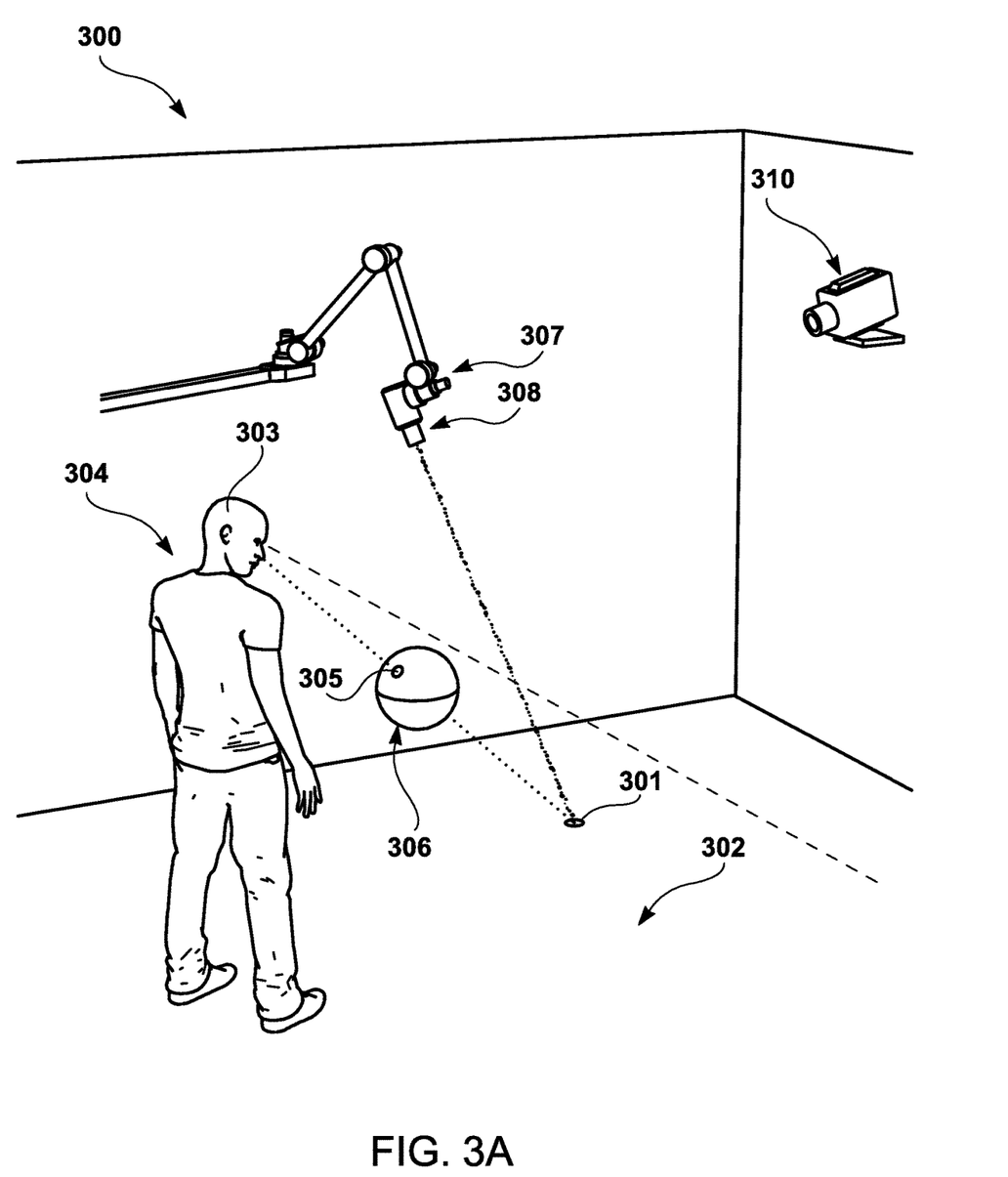
FIG. 3A illustrates a configuration of the virtual indicium display system illustrated in FIG. 2 that projects a virtual indicium on a surface.

FIGS. 3A-3D illustrate various examples of the virtual indicium 301 being projected onto a physical area of the physical environment. For instance, FIG. 3A illustrates a configuration of the virtual indicium display system 204 illustrated in FIG. 2 that projects a virtual indicium 301 on a surface 302 (e.g., floor). The tracking system 201 (FIG. 1) tracks the head position 303 of a user 304 (e.g., via one or more image capture devices 310). The current head position 303 is directed toward a portion of the floor that the user 304 is not supposed to be gazing at. Further, the AR system 100 (FIG. 1) is aware of a location of a virtual object 306 within a registered AR environment 300 and a point of interest 305 on that virtual object 306 (e.g., as determined by a script for video/image capture purposes).

Figure 3B:
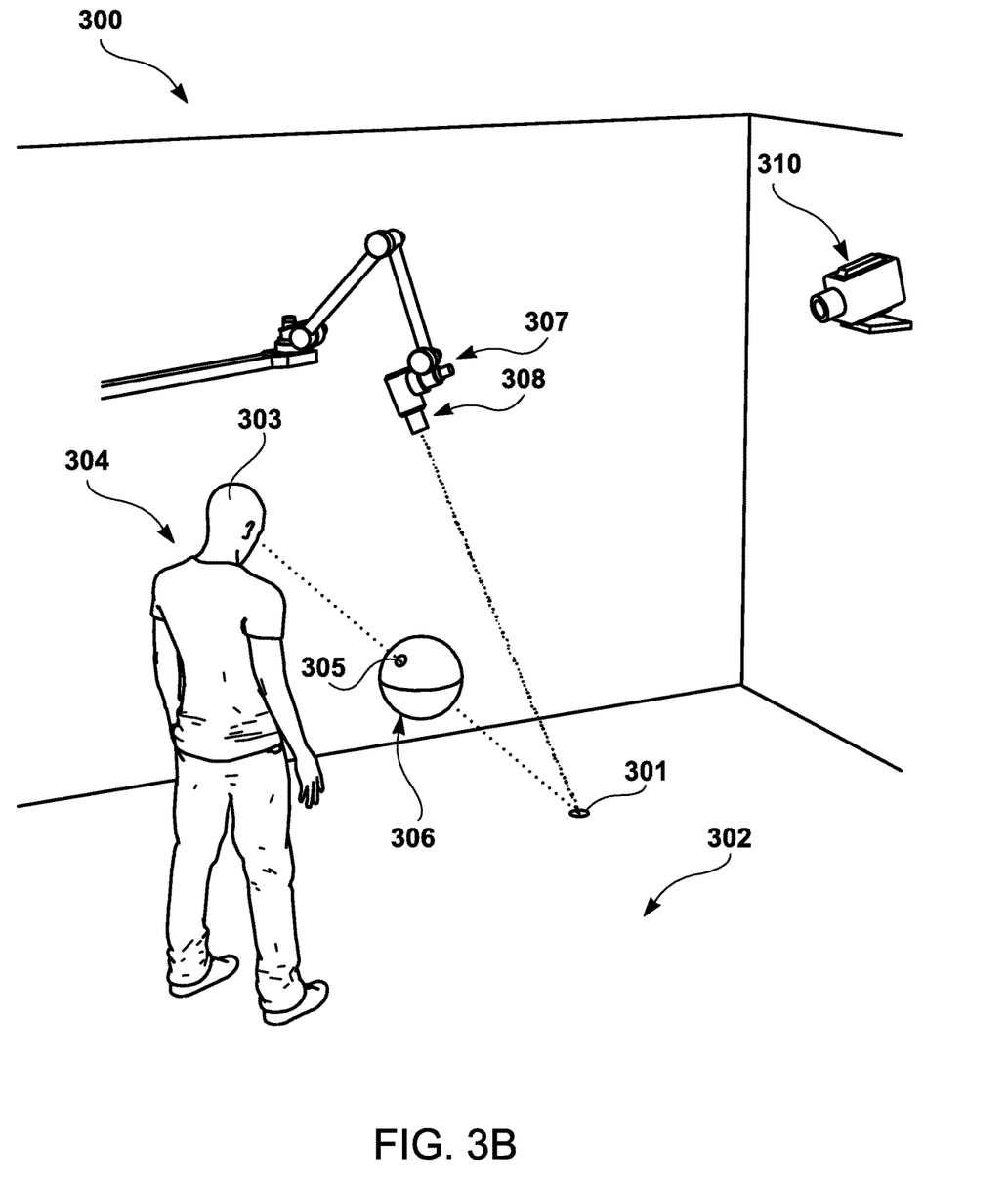
FIG. 3B illustrates the adjusted head position of the user toward the virtual indicium.

After determining the virtual indicium position, as discussed with respect to FIG. 2, the AR system 100 may provide an instruction to an actuator 307 that adjusts the position of a projector 308 (e.g., laser pointer, spot light, etc.) to project the virtual indicium 301 at the virtual indicium position on the surface 302. Based on the position of the virtual indicium 301 on the surface 302, the user 304 may then adjust the head position 303 to be directed toward the virtual indicium 301, as illustrated in FIG. 3B.

Figure 3C:
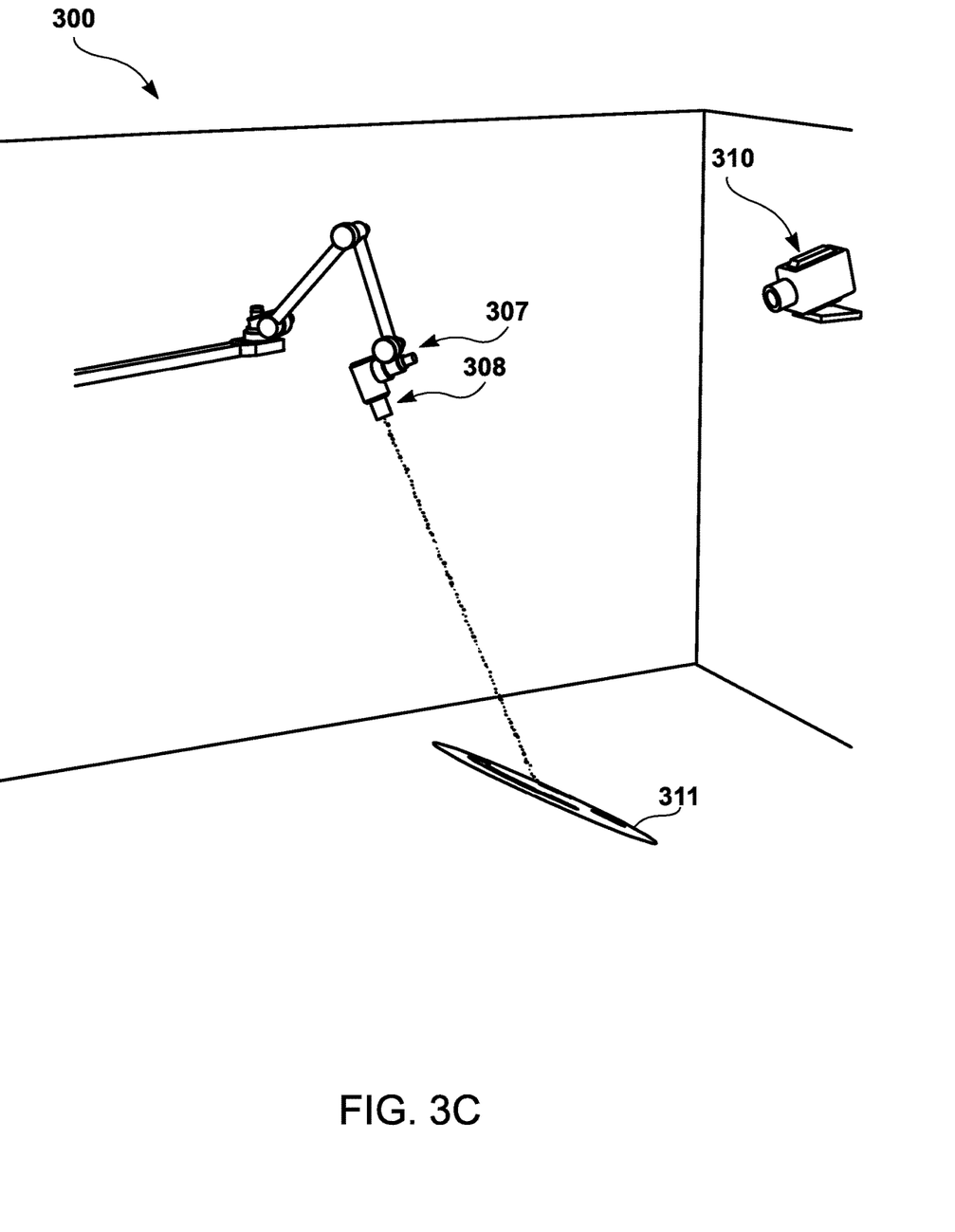
FIG. 3C illustrates a configuration of the virtual indicium display system illustrated in FIG. 2 that projects a pre-distorted two-dimensional virtual indicium, corresponding to a directorial cue, from the perspective of the camera rather than the perspective of the user.
Figure 3D:
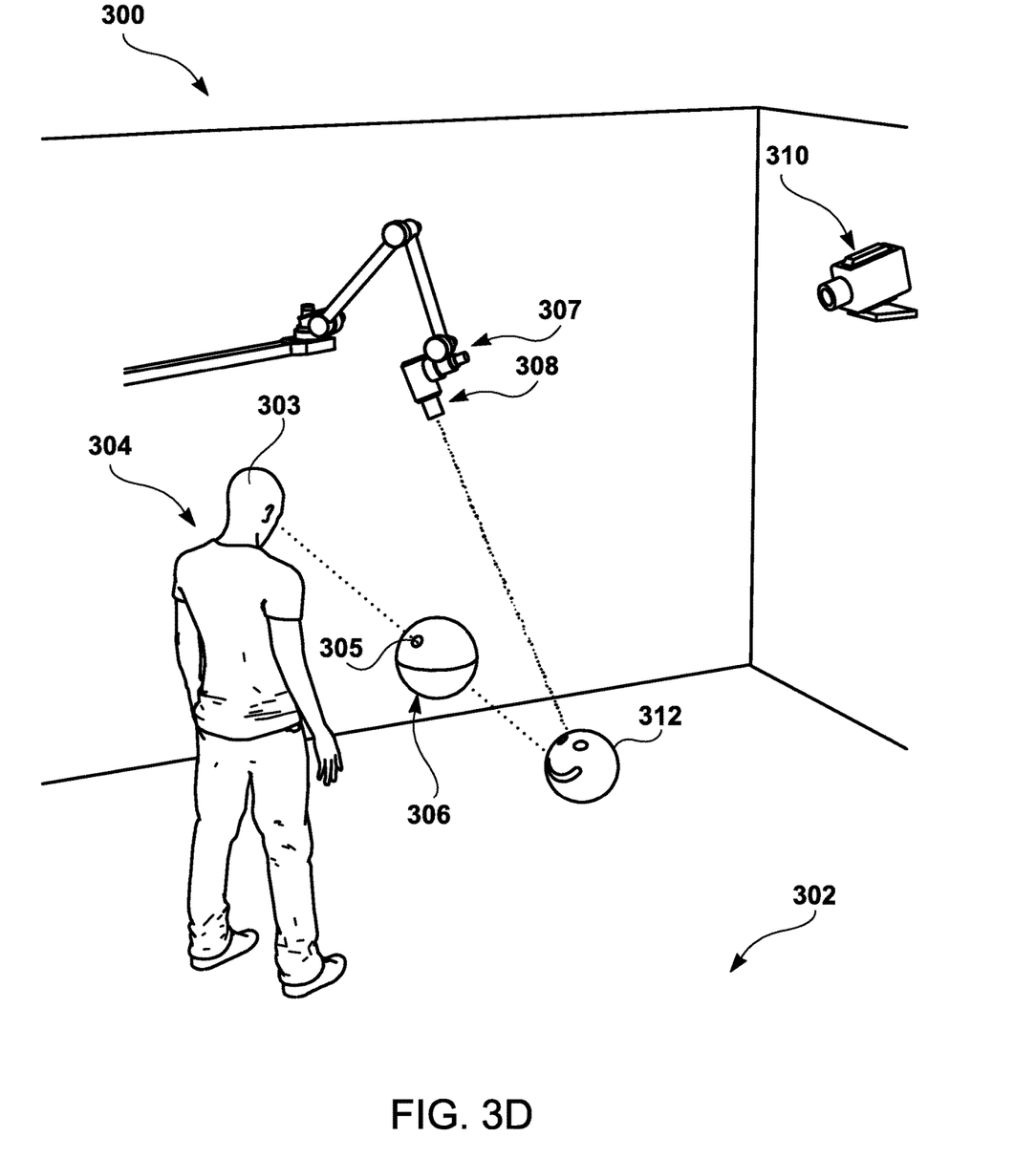
FIG. 3D illustrates the projector projecting the correct three-dimensional virtual indicium, corresponding to the directorial cue, from the perspective of the user.

In another aspect, the virtual indicium 301 illustrated in FIG. 3A may be pre-warped (e.g. anamorphic). For example, FIG. 3C illustrates a configuration of the virtual indicium display system 204 illustrated in FIG. 2 that projects a pre-distorted two-dimensional virtual indicium 311, corresponding to a directorial cue, from the perspective of the camera 310 rather than the perspective of the user 304. The pre-distorted two-dimensional virtual indicium 311 is projected in its pre-distorted form based on the geometry/shape of the physical environment illustrated in FIGS. 3A and 3B. In contrast, FIG. 3D illustrates the projector 308 projecting the correct three-dimensional virtual indicium 312 (e.g., smiley face that directs the user 304 to smile) from the perspective of the user 304. In other words, the correct three-dimensional virtual indicium 312 is calculated to appear in its correct based on the gaze of the user 304, as calculated by the vector that originates at the head position 303 and is directed through a point of intended gaze 305 on the virtual object 306 toward the virtual indicium 312. Accordingly, the user 304 is able to view the correct three-dimensional virtual indicium 312 as it appears on the surface 302.

Figure 3E:
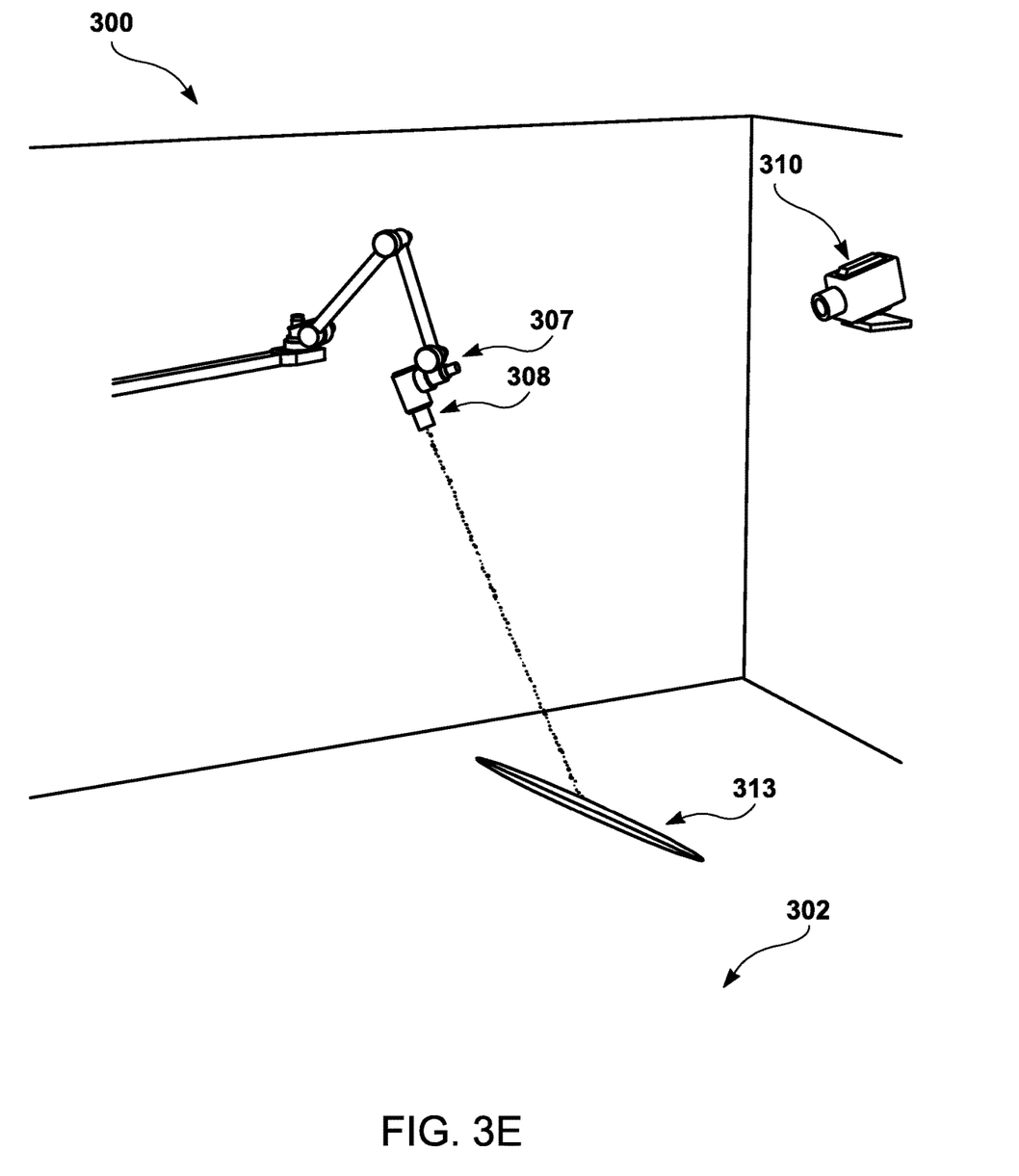
FIG. 3E illustrates a configuration of the virtual indicium display system illustrated in FIG. 2 that projects a pre-distorted two-dimensional virtual indicium that corresponds to a real-world image of the virtual object.
Figure 3F:
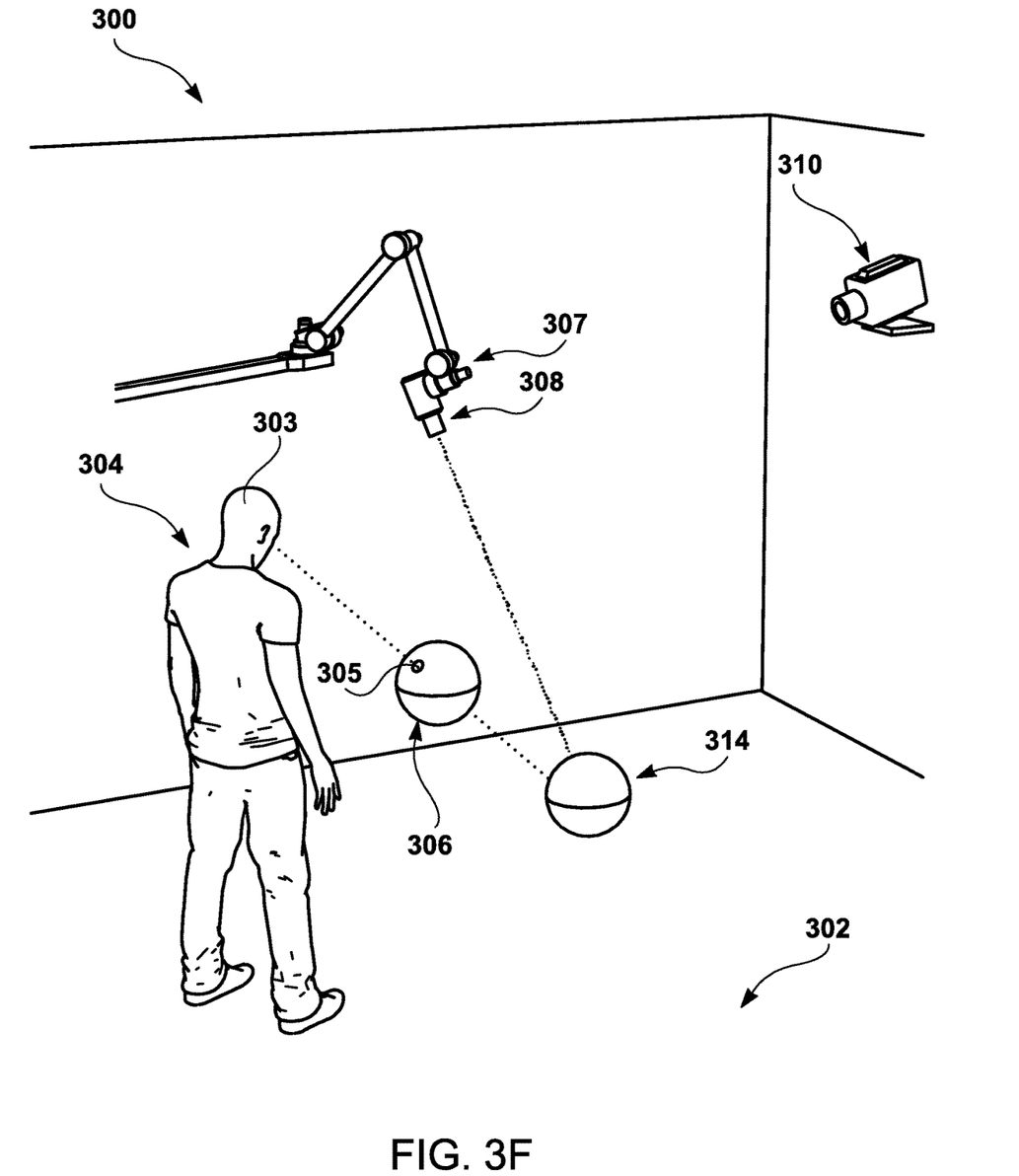
FIG. 3F illustrates the projector projecting the correct three-dimensional virtual indicium, corresponding to the real-world image of the virtual object, from the perspective of the user.

In yet another aspect, an image of the virtual object 306 may be used as the virtual indicium to provide the user 304 with a physical sense of the appearance of the virtual object 306. For instance, FIG. 3E illustrates a configuration of the virtual indicium display system 204 illustrated in FIG. 2 that projects a pre-distorted two-dimensional virtual indicium 313 that corresponds to a real-world image of the virtual object 306. Further, FIG. 3F illustrates the projector 308 projecting the correct three-dimensional virtual indicium 314 (e.g., undistorted real-world image of the virtual object 306) from the perspective of the user 304

Figure 4:
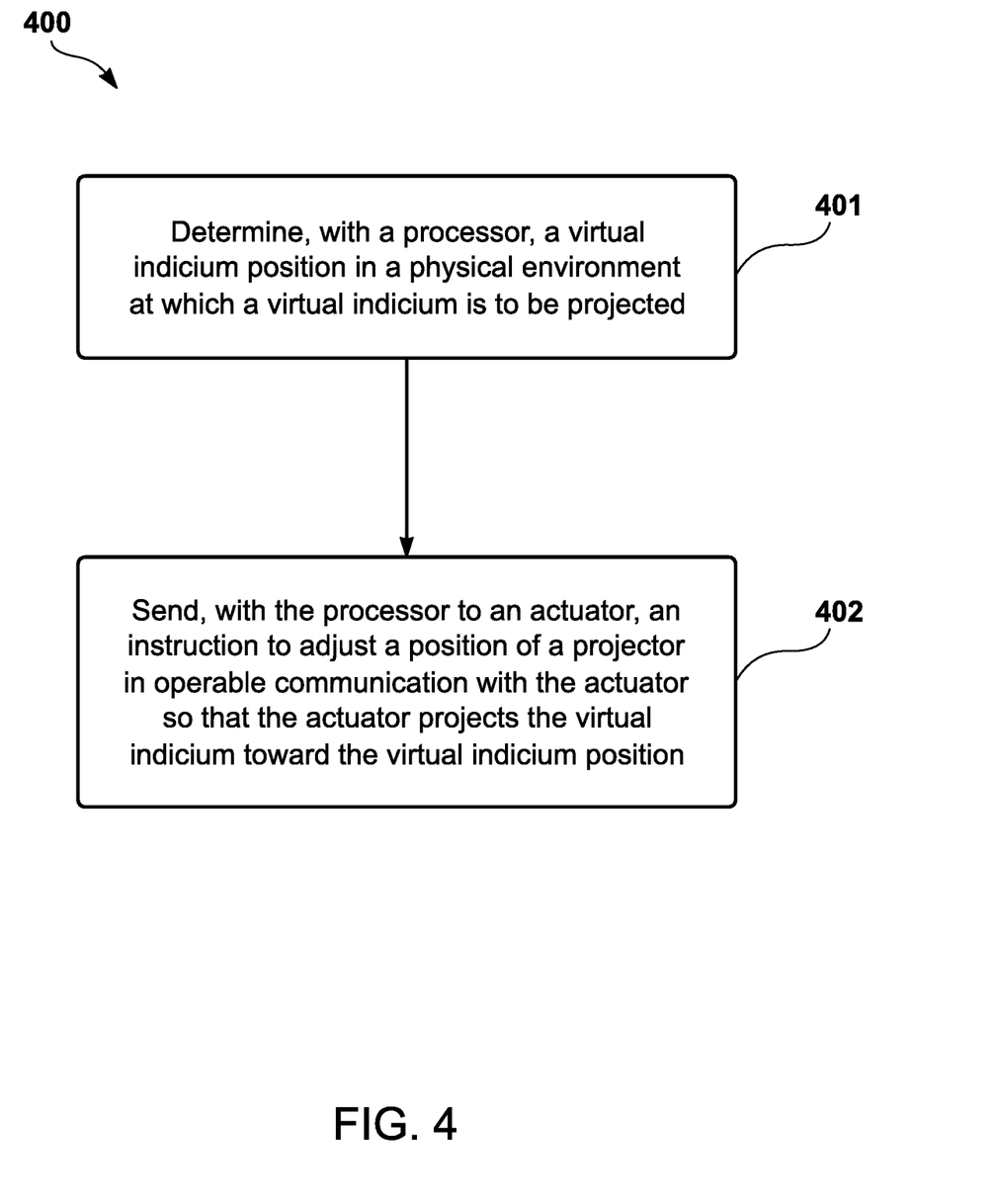
FIG. 4 illustrates a process that may be used by the AR system illustrated in FIG. 1 to project the virtual indicium onto the surface illustrated in FIGS. 3A-3D.

FIG. 4 illustrates a process 400 that may be used by the AR system 100 illustrated in FIG. 1 to project the virtual indicium 301 onto the surface 302 illustrated in FIGS. 3A-3D. At a process block 401, the process 400 determines, with the processor 101, a virtual indicium position in a physical environment at which the virtual indicium 301 is to be projected. The processor 101 determines the virtual indicium position based on a point of intersection of a vector and an object within the physical environment. The vector originates at a head position 303 (FIGS. 3A-3D) of a user 304 and is directed through a point of intended gaze on a virtual object toward the virtual indicium 301. Further, at a process block 402, the process 400 sends, with the processor 101 to the actuator 307, an instruction to adjust a position of the projector 308 in operable communication with the actuator 307 so that the projector 308 projects the virtual indicium 301 toward the virtual indicium position.

The scene, in which the user 304 (FIGS. 3A-3D) is gazing, may be recorded by an AR image capture device, or by a non-AR image capture device in front of a green screen, in the physical environment. The gaze may then be composited into the view of the AR image capture device, or green-screened into the feed of the non-AR image capture device. Further, the image capture device (AR or non-AR) may output the composite to a display device, which is integrated or in operable communication with the image capture device, that renders the virtual object 306 and the user 304 gazing at the virtual object 306 with respect to the physical environment. As a result, a recorded scene of the user 304 realistically gazing at the virtual object 306 may be displayed to an audience in various contexts (e.g., movie theater, television, etc.).

In addition, the recorded position of the virtual object 306 may change (e.g., according to a script that provides for movement of the virtual object). For example, the virtual object 306 may be a virtual character that moves with respect to the physical environment. Accordingly, the process 400 may be used to recalculate the vector and the position of the virtual indicium 301 based on the change to the position of the virtual object 306.

Further, the object geometry of the physical environment may change, which may also change the calculation of the vector and the position of the virtual indicium 301. For example, the position of a piece of furniture onto which the virtual indicium 301 is projected may change. In one aspect, a device (e.g., mobile computing device) may be used to scan the layout of the physical environment each time the position of an object within the physical environment is changed. The device may then send the updated physical environment layout to the AR system 100 (FIG. 1). In another aspect, a tracking device may be placed within, or adhered to, the object so that the tracker automatically, or by request of the AR system 100, updates the AR system 100 upon movement of the object. Accordingly, the process 400 may be used to recalculate the vector and the position of the virtual indicium 301 based on a change to the position of one or more objects within the physical environment, or a change to the physical environment itself.

Figure 5A:
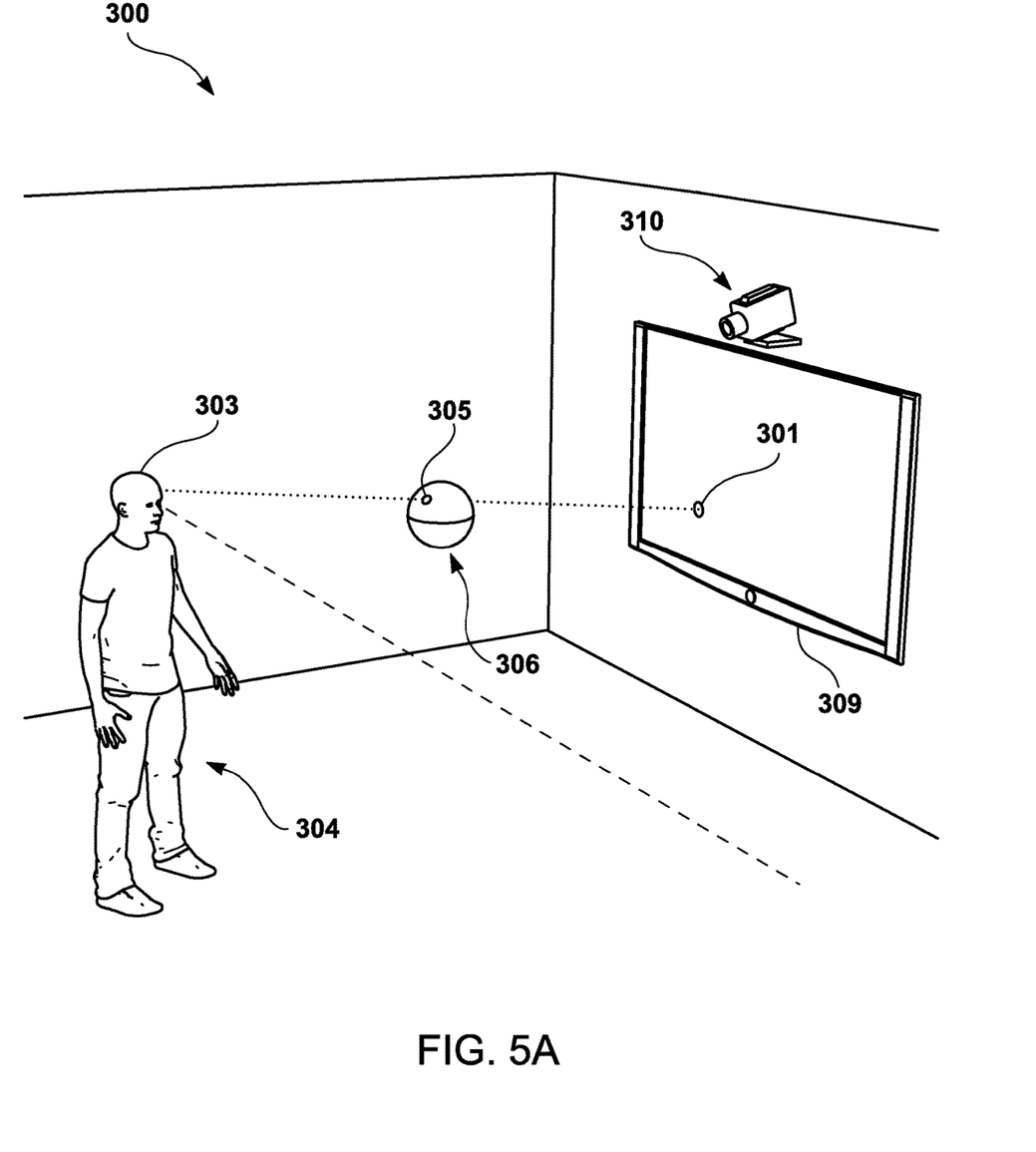
FIG. 5A illustrates the head position of the user not being directed toward the virtual indicium.
Figure 5B:
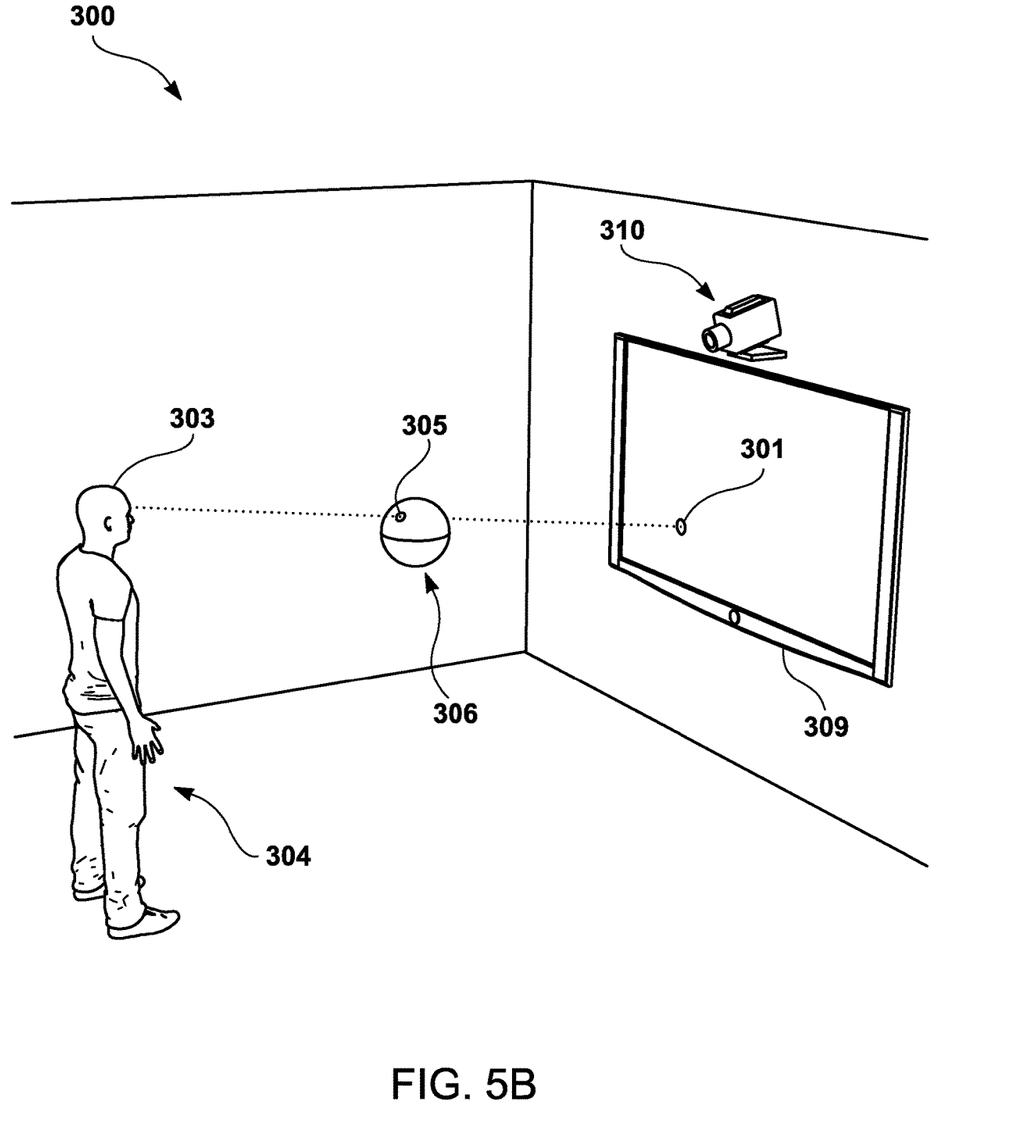
FIG. 5B illustrates the shifted head position so that the gaze is directed toward the virtual indicium as displayed by the display device.

FIGS. 5A and 5B illustrates an alternative configuration of the virtual indicium display system 104 illustrated in FIG. 3 that displays the virtual indicium 301 on a display device 309 (e.g., television, monitor, rear-projection screen, etc.). FIG. 5A illustrates the head position 303 of the user 304 not being directed toward the virtual indicium 301. The AR system 100 may provide an instruction to the display device 309 to display the virtual indicium 301 at a position in the physical environment corresponding to the intersection point. The user 303 may then shift the head position 303, as illustrated in FIG. 5B, so that the gaze is directed toward the virtual indicium 301, as displayed by the display device 309.

As an alternative to the display device 309, the projector 308 (FIGS. 3A-3D) may project an image, which encompasses the potential range of motion of the virtual indicium 301. The projector 308 may then project a dot, or other virtual indicium 301, within various positions of the projected image. Further, the projector 308 may project the dot based on the shape of the physical environment onto which the virtual indicium 301 is projected. For instance, the projector 308 may project an image onto an area that encompasses a portion of a wall and a portion of a floor. Accordingly, the projected image may appear to fold at the corner at which the wall and floor meet. Therefore, the dot may appear at either of the wall or the floor.

Figure 6:
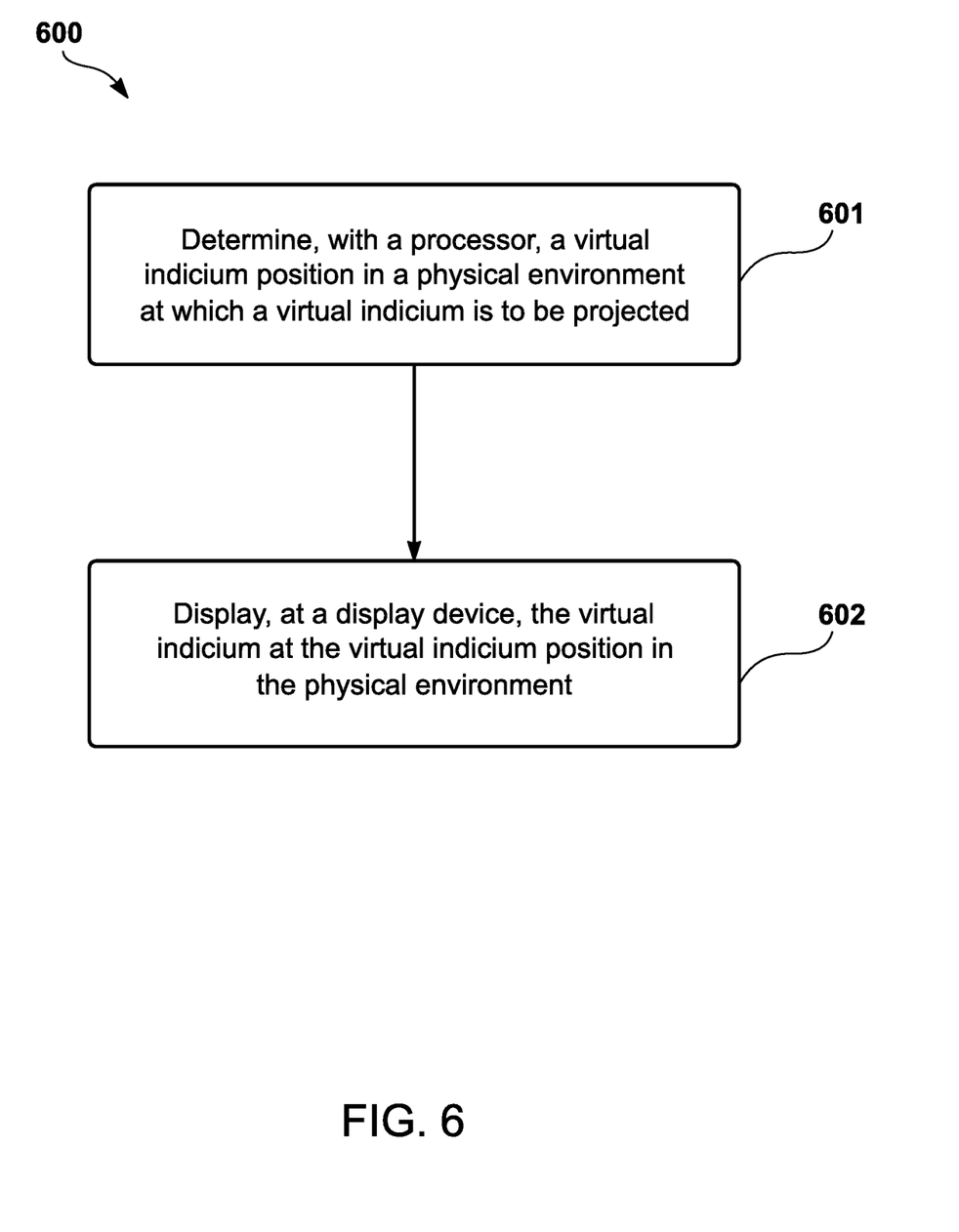
FIG. 6 illustrates a process that may be used by the AR system illustrated in FIG. 1 to display the virtual indicium at the display device illustrated in FIGS. 5A and 5B.

FIG. 6 illustrates a process 600 that may be used by the AR system 100 illustrated in FIG. 1 to display the virtual indicium at the display device 309 illustrated in FIGS. 5A and 5B. At a process block 601, the process 600 determines a virtual indicium position in a physical environment at which a virtual indicium is to be projected. The processor 101 determines the virtual indicium position based on a point of intersection of a vector and an object within the physical environment. The vector originates at a head position 303 of a user 304 and is directed through a point of intended gaze on a virtual object 306 toward the virtual indicium 301. Further, at a process block 602, the process

600 displays, at the display device 309, the virtual indicium 301 at the virtual indicium position in the physical environment.

The processes described herein may be implemented in a specialized processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool.

A computer readable medium may be any medium, e.g., computer readable storage device, capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a specialized, general, multi-purpose, or single purpose processor as described above. For example, a computer may be a desktop computer, laptop, smartphone, tablet device, set top box, etc.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

I claim:

1. A system to direct a gaze of a user toward a virtual object invisible to the user during augmented-reality video production, the system comprising:
   a processor that determines a virtual indicium position in a physical environment at which a virtual indicium is to be projected, the processor determining the virtual indicium position based on a point of intersection of a vector and a surface within the physical environment, the vector originating at a head position of the user and being directed through a point of intended gaze in the physical environment toward the virtual indicium, the point of intended gaze in the physical environment corresponding to a point on the virtual object in a virtual environment that is invisible to the user;
   a projector that projects the virtual indicium, wherein the projector is positioned within the physical environment at a position remote from the head position of the user; and
   an actuator in operable communication with the projector, wherein the actuator receives an instruction from the processor to adjust the position of the projector such that the projector projects the virtual indicium toward the virtual indicium position, wherein augmented-reality video content is generated that composites the user and the virtual object such that the user is portrayed as gazing at the virtual object, and wherein the augmented-reality video content does not include the virtual indicium.

2. The system of claim 1, wherein the vector comprises three-dimensional coordinates.

3. The system of claim 1, further comprising a tracking device that determines the head position of the user without the user wearing a head apparatus.

4. The system of claim 3, wherein the tracking device comprises a camera or a magnetic sensor.

5. The system of claim 1, wherein the surface is of an object, wherein the processor receives a physical environment layout that identifies the object, receives a virtual environment layout, registers the virtual environment layout with respect to the physical environment layout, and determines a position of the virtual object with respect to the physical environment.

6. The system of claim 1, wherein the virtual indicium position is outside of a field of view of a capture device configured to record a scene portraying the user gazing at the virtual object, and wherein the augmented-reality video content is generated based on the recorded scene and on a rendering of the virtual object.

7. The system of claim 1, wherein the surface is of an object, wherein the object is selected from the group consisting of: a wall of the physical environment, a floor of the physical environment, and a ceiling of the physical environment.

8. The system of claim 1, wherein the processor adjusts a size of the virtual indicium to provide one or more cues with respect to the intended gaze.

9. A system to direct a gaze of a user toward a virtual object invisible to the user during augmented-reality video production, the system comprising:
   a processor that determines a virtual indicium position in a physical environment at which a virtual indicium is to be projected, the processor determining the virtual indicium position based on a point of intersection of a vector and a surface within the physical environment, the vector originating at a head position of the user and being directed through a point of intended gaze in the physical environment toward the virtual indicium, the point of intended gaze in the physical environment corresponding to a point on the virtual object in a virtual environment that is invisible to the user; and
   a display device that displays the virtual indicium at the virtual indicium position in the physical environment, wherein augmented-reality video content is generated that composites the user and the virtual object such that the user is portrayed as gazing at the virtual object, and wherein the augmented-reality video content does not include the virtual indicium.

10. The system of claim 9, wherein the vector comprises three-dimensional coordinates.

11. The system of claim 9, further comprising a tracking device that determines the head position of the user without the user wearing a head apparatus.

12. The system of claim 11, wherein the tracking device comprises a camera or a magnetic sensor.

13. The system of claim 9, wherein the surface is of an object, wherein the processor receives a physical environment layout that identifies the object, receives a virtual environment layout, registers the virtual environment layout with respect to the physical environment layout, and determines a position of the virtual object with respect to the physical environment.

14. The system of claim 9, wherein the virtual indicium comprises a marker, a symbol, imagery, or text.

15. The system of claim 9, wherein the virtual indicium position is outside of a field of view of a capture device configured to record a scene portraying the user gazing at the virtual object, and wherein the augmented-reality video content is generated based on the recorded scene and on a rendering of the virtual object.

16. The system of claim 9, wherein the processor adjusts a size of the virtual indicium to provide one or more cues with respect to the intended gaze.

17. A computer program product comprising a non-transitory computer readable storage device having a computer readable program stored thereon, wherein the computer readable program when executed on a computer causes the computer to perform an operation to direct a gaze of a user toward a virtual object invisible to the user during augmented-reality video production, the operation comprising:

determining, with a processor, a virtual indicium position in a physical environment at which a virtual indicium is to be projected, the processor determining the virtual indicium position based on a point of intersection of a vector and a surface within the physical environment, the vector originating at a head position of the user and being directed through a point of intended gaze in the physical environment toward the virtual indicium, the point of intended gaze in the physical environment corresponding to a point on the virtual object in a virtual environment that is invisible to the user; and sending, with the processor to an actuator, an instruction to adjust a position of a projector in operable communication with the actuator such that the projector projects the virtual indicium toward the virtual indicium position, the projector being positioned within the physical environment at a position remote from the head position of the user, wherein augmented-reality video content is generated that composites the user and the virtual object such that the user is portrayed as gazing at the virtual object, and wherein the augmented-reality video content does not include the virtual indicium.

18. The computer program product of claim 17, wherein the vector comprises three-dimensional coordinates.

19. The computer program product of claim 17, wherein the operation further comprises tracking, with a tracking device, the head position of the user without the user wearing a head apparatus.

20. The computer program product of claim 19, wherein the tracking device comprises one or more cameras.

* * * * *